SENSE AMPLIFIER INCLUDING A DIFFERENTIAL AMPLIFIER WITH INPUT COUPLED TO DRIVE-SENSE WINDINGS

Filed Aug. 8, 1966 2 Sheets-Sheet 1

INVENTORS
DAVID W. MAYNE
LOY L. SPEARS
BY Samuel Lindenberg
Abraham Wasserman
ATTORNEYS Sept. 9, 1969 D. W. MAYNE ET AL 3,466,630

SENSE AMPLIFIER INCLUDING A DIFFERENTIAL AMPLIFIER
WITH INPUT COUPLED TO DRIVE-SENSE WINDINGS

Filed Aug. 8, 1966 2 Sheets-Sheet 2

INVENTORS
DAVID W. MAYNE
LOY L. SPEARS
BY Samuel Lindenberg
Abraham Wasserman
ATTORNEYS

United States Patent Office 3,466,630
Patented Sept. 9, 1969

3,466,630

SENSE AMPLIFIER INCLUDING A DIFFERENTIAL AMPLIFIER WITH INPUT COUPLED TO DRIVE-SENSE WINDINGS

David W. Mayne, Torrance, and Loy Leonard Spears, Malibu, Calif., assignors to Ampex Corporation, Culver City, Calif., a corporation of California Filed Aug. 8, 1966, Ser. No. 571,108
Int. Cl. G11c *7/06, 11/06*
U.S. Cl. 340—174 10 Claims

ABSTRACT OF THE DISCLOSURE

An improved coincident-current digital memory network including an improved sense amplifier means. The amplifier includes a differential amplifier with the input coupled to driven-sense windings and the output to a clamp circuit such that the output is clamped when the memory is in the drive mode in contrast to the sense mode. No reactive components need be included in the differential amplifier so that the amplifier gain is a function of the value ratios of the resistors. The differential amplifier further lends itself to incorporating transistors all of the same polarity. A symmetrical discriminator may be included to enable the sensing of bi-polar signals with the clamp circuit connected to the output of the discriminator.

This invention relates to digital memory systems and, more particularly, to improved sense amplifier means for use therein.

A magnetic core digital memory generally consists of a plurality of memory planes, each plane comprising a matrix of cores arranged in rows and columns. Each core is switchable between its two states of magnetic remanence. Thus a binary "1" may be written into a core by driving it to one state of magnetic remanence, while a binary "0" is written or stored in the core by driving it to the other state. The bits stored in a core may be read out by driving the core to one of its states and sensing a signal which is induced in a sense winding threaded through the core if the core is not already in such state. The signal is produced by a sense amplifier which is coupled to the sense winding.

Various techniques have been developed to drive the magnetic cores between their magnetic states. In one technique, known as coincident current, at least two drive lines which are connected to two current drivers are threaded through each core, so that only when drive currents are present in both windings, coincidentially, is the core switchable from one state to the other. The switching may be sensed by a separate sense winding connected to the sense amplifier, or by utilizing one of the drive windings to serve as a sense winding, in addition to its function of providing the core with drive current. Such windings, due to their double function, may be thought of as drive-sense windings which are connected to the current driver, as well as to the sense amplifier. Since the differential signals produced by the rise of the driving currents are substantially greater than the signals produced by the core as a result of the change of its magnetic state, means must be provided in the sense amplifier to distinguish between the very low signals produced by the change of state of the core and the relatively larger current signals used to induce core switching.

Additional circuitry has to be provided when, in order to reduce the number of required sense amplifiers, a plurality of drive-sense windings are connected to a single sense amplifier. Such circuitry ofter includes reactive components which suffer from paralysis after the passage of large overload signals therethrough, thus requiring relatively long recovery periods. Consequently, the speed with which a sense amplifier may be safely operated is greatly reduced, limiting the overall speed of the entire memory system. Thus, a need exists for a sense amplifier, connectable to a plurality of drive-sense windings, which is capable of operating at high speeds without limiting the speed of operation of the memory system. Other desired characteristics of a sense amplifier intended to be used in the digital memory system are high input impedance, capability of sensing bipolar pulses, and good common mode rejection capabilities. Also, in order to reduce the overall size of the sense amplifier, it is desirable that the amplifier comprise a minimum number of critical components which lead themselves to integrated circuitry construction.

Accordingly, it is an object of the invention to provide an improved sense amplifier intended to be used in a digital memory system.

Another object is the provision of a new sense amplifier intended to be used in a coincident current type digital memory system in which one of the driving windings is also used as a sensing winding connected to the amplifier.

A further object is the provision of a sense amplifier particularly designed to be used in a digital memory system of the coincident-current type, in which a number of windings which alternate between driving magnetic memory elements and sensing the switch of the elements are coupled to a single sense amplifier.

Still a further object is to provide a multistage transistorized differential amplifier which lends itself to integrated circuit construction.

Still a further object of the present invention is to provide a new relatively fast sense amplifier intended to be used in a coincident-current type digital memory system, with the amplifier including means for minimizing the response of the amplifier to signals other than a signal indicative of the change in magnetic state of cores through which are threaded sense windings coupled to the amplifier.

These and other objects of the invention are achieved by providing a sense amplifier which includes a multistage differential amplifier, a clamp circuit, coupled to the output of the differential amplifier, a symmetrical discriminator to enable the sensing of bipolar signals and an output amplifier. The multistage differential amplifier which is directly coupled with no reactive components includes a plurality of transistors of the same type or polarity interconnected, so that the gain of the amplifier is a function of the ratio of a minimum number of resistors. The use of the same type transistors and the fact the gain is controlled as the ratio of components rather than as a function of absolute values are two characteristics, highly advantageous when constructing the differential amplifier as an integrated circuit. The clamp circuit of the sense amplifier is connected to the output of the differential amplifier which is also connected to the symmetrical discriminator. The function of the clamp circuit is to inhibit the discriminator and output amplifier connected to the discriminator from providing an output signal, irrespective of relatively large different input signals supplied to the differential amplifier by the sense windings connected thereto until the windings serve to sense the switching of a magnetic core, providing relatively small signals to the differential amplifier.

The novel features that are considered characteristic of this invention are set forth with particularity in the appended claims. The invention will best be understood from the following description when read in connection with the accompanying drawings, in which:

Figure 1:
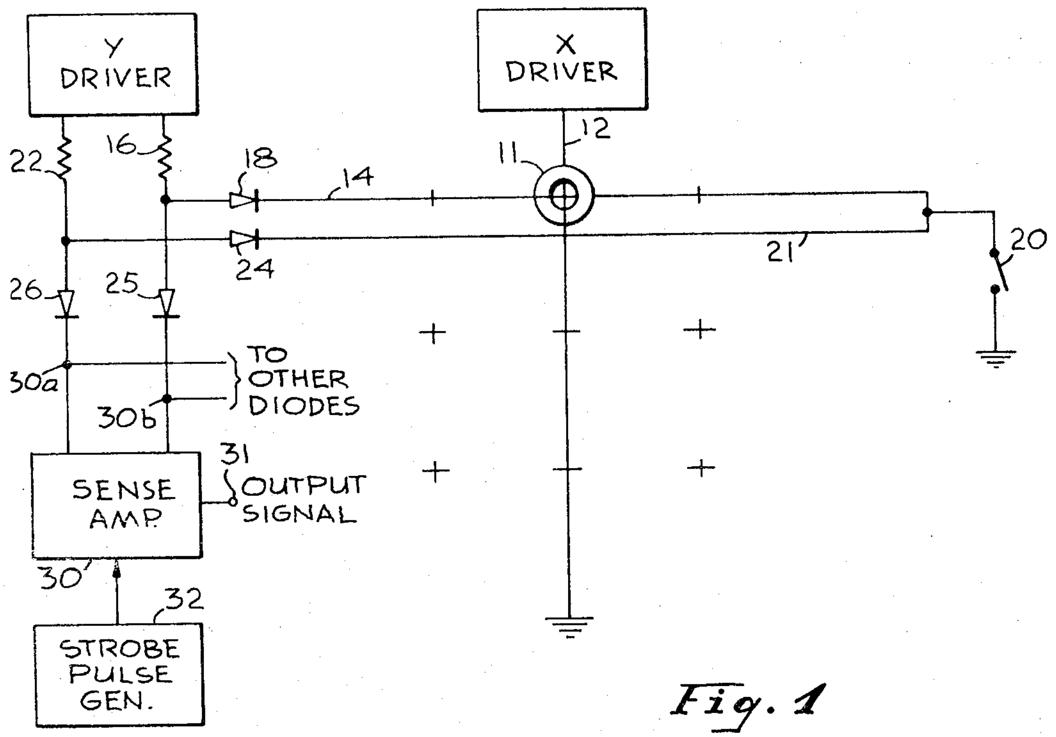
FIGURE 1 is a simplified diagram of a core memory plane.

Attention is now directed to FIGURE 1 of the drawings which schematically illustrates a conventional digital memory plane comprised of a matrix of magnetic core memory elements, such as core 11, arranged in rows and columns. The core 11 is assumed to be driven or switched to either of its two states of magnetic remanence by coincident currents in drive windings 12 and 14 which are threaded through the core. The ends of drive winding 12 threaded through all the cores in the same column as core 11 are connected to ground and a source of current designated X driver, while one end of drive winding 14 threaded through all the cores in the row of core 11 is connected through a resistor 16 and a diode 18 to a second current source, designated Y drive. The other end of winding 14 is connected to ground through a normally open automatically actuatable switch 20. The Y driver is also connected to the switch by means of a line 21 through a resistor 22 and a diode 24 which are identical to resistor 16 and diode 18 respectively. In practice an additional Y driver providing negative current to switch the core 11 to the opposite state from that to which it is switchable by the Y driver, is included. Such an additional driver is coupled to the core by another pair of diodes, such as diodes 18 and 24. However, in order to simplify FIGURE 1 the additional circuitry is deleted.

In addition, a pair of diodes 25 and 26 connect input terminals **30*a* and 30*b* of a sense amplifier 30 to the junction points of resistor 16 with diode 18 and resistor 22 with diode 24 respectively. The sense amplifier 30 having an output terminal 31 is controlled by pulses from a strobe pulse generator 32. Briefly, the function of the generator 32 is to control amplifier 30 to provide an output signal only in response to the change in magnetic state of core 11 as a function of drive currents from the X and Y driver, rather than as a function of the drive current supplied thereto through resistors 16 and 22 and diodes 25 and 26**.

Figure 2:
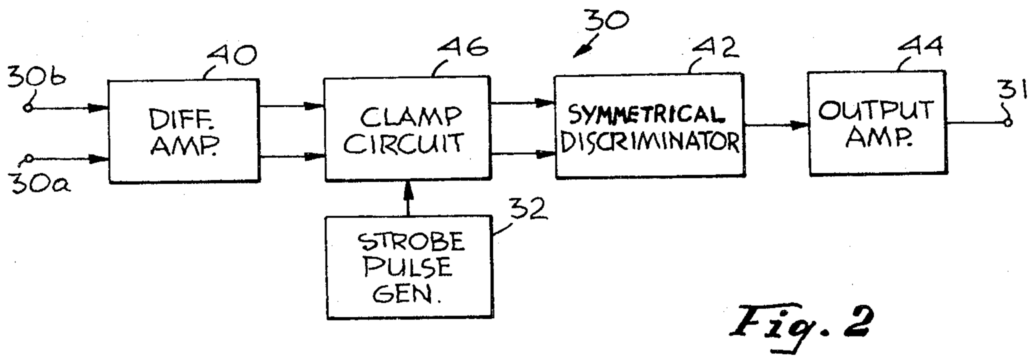
FIGURE 2 is a simplified block diagram of the sense amplifier of the present invention.

For a better explanation of the sense amplifier of the invention, reference is made to FIGURE 2 which is a simplified block diagram of the amplifier. As in a conventional sense amplifier connected only to a sense winding, the amplifier 30 includes an input stage comprising a differential amplifier 40 and an output stage which includes a symmetrical discriminator 42 and an output amplifier 44, the output of which is connected to the output terminal 31. In addition, the amplifier 30 includes a clamp circuit 46 interposed between amplifier 40 and discriminator 42. The clamp circuit is also connected to the strobe pulse generator 32.

As may be seen from FIGURE 1, when switch 20 is closed, drive current from the Y driver flows in winding 14 as well as in line 21. In addition, this drive current flows to input terminals **30*a* and 30*b* through diodes 26 and 25 respectively. As is appreciated by those familiar with the art, due to spreads in individual semiconductor voltage drops when conducting, unless diodes 25 and 26 are perfectly matched, due to the drive current from Y driver a voltage difference exists between input terminals 30*a* and 30*b*. This voltage difference will result in an output signal from amplifier 44, unless the sense amplifier is inhibited from producing such a signal. This is accomplished by the clamp circuit 46. On the other hand when in coincidence with the current from the Y driver, drive current is provided by the X driver, the sense amplifier is enabled to sense the switching of core 11 by sensing the coincident signal induced in winding 14 as compared with the absence of a signal in line 21** which is not threaded through any of the cores. Since the induced signals due to core switching are much smaller than the voltage differences produced by the drive currents, the amplifier is designed to prevent undesired large signals from producing an output signal, yet respond to desired small signals to provide an output signal in response thereto.

Figure 3:
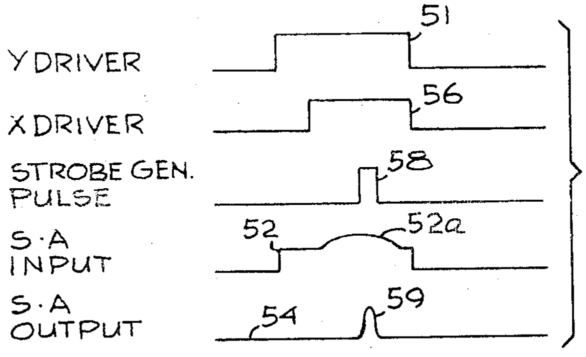
FIGURE 3 is a waveform diagram useful in explaining the operation of the amplifier.

For an understanding of how the memory system of FIGURE 1 is operated, consider the waveforms of FIGURE 3. To switch a core 11 to a selected state, if the core is not already in such state, a current drive pulse 51 is provided by the Y driver. Due to the difference in the voltage drops across diodes 25 and 26 a potential difference may exist at input terminals **30*a* and 30*b* as indicated by the leading edge of pulse 52. However, due to the clamping action of clamp circuit 46 (FIGURE 2), the output of sense amplifier 30 remains unaffected, as seen by the straight line 54** of SA output.

However, when a drive current pulse 56 is supplied by the X driver in time coincidence with pulse 51, the core 11 (FIGURE 1) may be switched to produce a coincident signal sensed by the sense amplifier 30 as indicated by the curved line **52*a* of pulse 52. However, the output of sense amplifier remains unaltered until a pulse 58 from the strobe generator 32 is supplied thereto to unclamp the clamp circuit 46. When this occurs, the signal produced by the switching of the core (line 52*a*) results in an output signal or pulse 59** provided by the sense amplifier.

It should be noted that in the absence of a current drive pulse from either driver, irrespective of the strobe generator pulse the sense amplifier will not provide an output signal, since current from one driver is insufficient to switch the core. Also, even with both current pulses causing the switching of the core, the sense amplifier may not provide an output signal without the strobe generator pulse which unclamps the clamp circuit 46.

Figure 4:
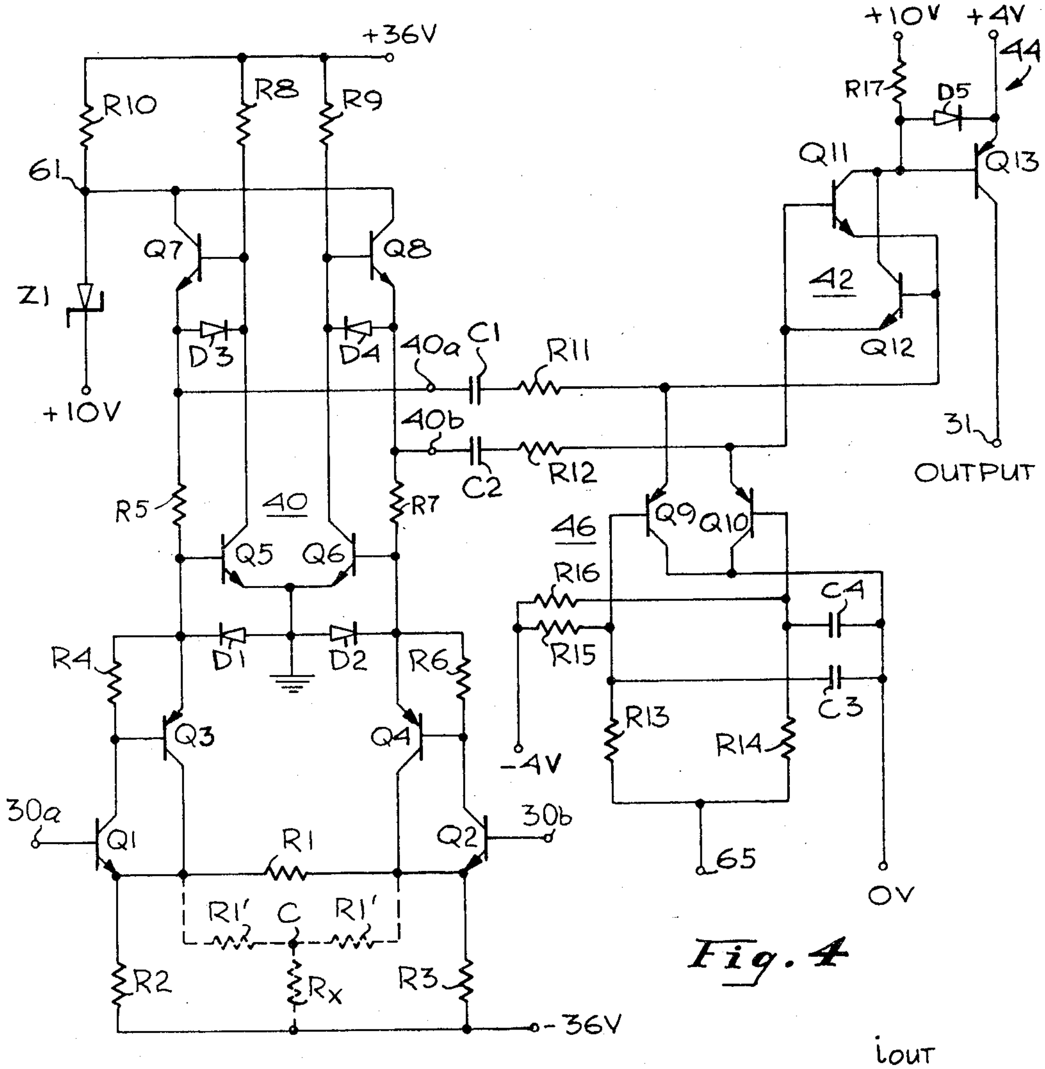
FIGURE 4 is a schematic diagram of the amplifier.

Attention is now directed to FIGURE 4 which is a schematic diagram of the sense amplifier 30. It includes transistors Q1 through Q8 which together with associated resistive and semiconductor components comprise the differential amplifier 40 (FIGURE 2), and transistors Q9, Q10 which form the clamp circuit, together with capacitors C1 and C2 and associated resistors and capacitors. The symmetrical discriminator 42 includes transistors Q11 and Q12, while the output amplifier 44 includes transistor Q13.

As may be seen from FIGURE 4, the bases of transistors Q1 and Q2 are connected to input terminals **30*a* and 30*b*** respectively, while the collectors and emitters of the two transistors are connected to the bases and collectors respectively, of transistors Q3 and Q4. The emitters of Q1 and Q2 are interconnected by a resistor R1 and to a negative reference potential such as −36 v. through respective resistors R2 and R3. A resistor R4 interconnects the base and emitter of transistor Q3 with the emitter being also connected to the base of transistor Q5 and one side of a resistor R5. Similarly, the base and emitter of Q4 are interconnected through a resistor R6, with the emitter being connected to the base of Q6 and to one terminal of a resistor R7. The emitters of Q5 and Q6 are connected to a second source of reference potential such as ground and to the anode terminals of diodes D1 and D2 respectively, the cathods of which are connected to the bases of the two transistors.

The other terminal of R5 which is connected to one output terminal **40*a* of the differential amplifier 40 is also connected to the anode of a diode D3 and the emitter of Q7, the base of which is connected to the cathode terminal of D3 and the collector of Q5. Similarly, R7 is connected to the other output terminal 40*b* and to the anode terminal of D4 and emitter of Q8, the base of which is connected to the cathode of D4 and collector of Q6. The bases of Q7 and Q8 are connected through resistors R8 and R9 to a source of positive potential such as +36 v. while their collectors are tied to a point 61 at a fixed DC potential produced by a resistor R10 having one terminal tied to point 61 and the other to the +36 v. source and a Zener diode Z1 tied between point 61** and a source of +10 v.

Figure 5:
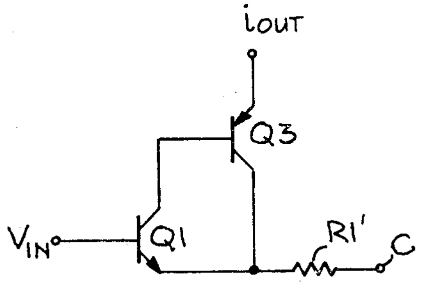
FIGURES 5 and 6 are partial schematic diagrams, useful in explaining the gain characteristics of the sense amplifier.

For the purpose of analyzing the differential amplifier 40, let it be assumed that resistor R1 is replaced by a pair of resistors R1' (shown in dashed lines) joined at a common point C which is connected to —36 v. through a resistor R*x*. Since to differential signals at terminals 30*a* and 30*b*, the common point C may be regarded as a voltage node, the transconductance of a single stage of the amplifier comprising transistors Q1 and Q2 and resistors R1' and R*x* can be expressed as $$\frac{i_{out}}{v_{in}}=\frac{1}{R1'} \qquad (1)$$

where $i_{out}$ is the difference of the collector currents of transistors Q1 and Q2 and $v_{in}$ is the voltage difference at terminals 30*a* and 30*b*. By adding a second stage comprising transistors Q3 and Q4, the transconductance remains controlled only by R1'. However, in such an arrangement $i_{out}$ represents the difference in emitter currents of Q3 and Q4. One half of the two stage differential amplifier is diagrammed in FIGURE 5.

Figure 6:
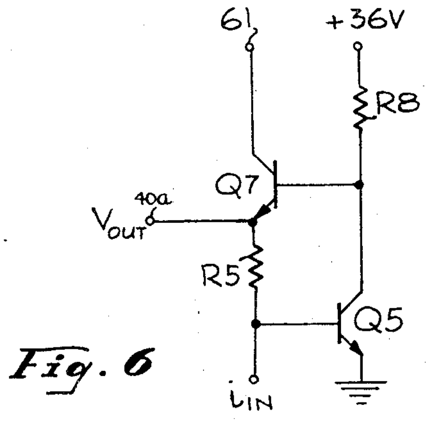

In certain applications and as will be shown hereafter in the present amplifier, it is desired that the output of the differential amplifier be a voltage with a low output impedance. This is accomplished by connecting, in each half of the differential amplifier, two transistors such as Q5 and Q7 which essentially form a two stage inverting amplifier with resistive feedback provided by R5 between the output at terminal 40*a* and the input current at the base of Q5. The two stage inverting amplifier is separately diagrammed in FIGURE 6. The transresistance may be expressed as $$\frac{V_{out}}{i_{in}}=R_5 \qquad (2)$$

By connecting the emitter of Q3 (FIGURES 4 and 5) with the base of Q5 (FIGURES 4 and 6), $i_{out}$ in equation (1) is the same as $i_{in}$ in equation (2) so that the total gain of the half of amplifier 40 comprising transistors Q1, Q3, Q5, and Q7 can be expressed as $$A=\frac{V_{out}}{V_{in}}=\frac{i_{out}}{V_{in}}\times\frac{V_{out}}{i_{in}}=\frac{1}{R1'}\times R5=\frac{R5}{R1'} \qquad (3)$$

Hence the gain of the left half of amplifier 40 is controlled by the ratio of two resistors with the amplifier having a high input impedance and a low output impedance. Similarly, the gain of the right hand half of amplifier 40 comprising transistors Q2, Q4, Q6 and Q8 may be evpressed as R7/R1'. The two R1' resistors and resistor R*x* may be replaced by the single resistor R1 and the resistors R2 and R3, with the differential gain of amplifier 40 being expressed as $$A_{diff}=\frac{R5+R7}{R1} \qquad (4)$$

Hence, the gain of the eight transistor differential amplifier is directly a function of the values of the three resistors.

It should be noted that the gain is controlled by resistor ratios rather than absolute resistor values. This is quite significant when constructing the amplifier as an integrated circuit where it is difficult to hold close tolerances on the abosolute values of resistors but is relatively easy to maintain close tolerances or resistor ratios. Also, the absence of reactive components further enhances the amplifier's advantages from an integrated circuit point of view.

As seen from FIGURE 4, differential amplifier 40 also includes diodes D1 through D4. The functions of diodes D1 and D2 is to protect the base emitter junctions of Q3 and Q4 respectively, against excessive reverse voltage due to any overload input conditions, while diodes D3 and D4 are included to speed up large negative going signals at the emitters of Q7 and Q8 respectively. For example, when the emitter of Q7 is to go negative, the rate is limited by the current that can flow through R5. However, diode D3 will augment the flow of current by diverting current into the collector of Q5.

From the foregoing, it should be appreciated that the sense amplifier of the invention includes a multistage differential amplifier, the gain of which is conveniently controlled as the ratio of three resistors. Also, but for transistors Q3 and Q4, the differential amplifier which is directly coupled and has high input impedance and low output impedance, incorporates transistors of the same type which facilitate its construction as an integrated circuit.

The output terminals 40*a* and 40*b* of the differential amplifier 40 are connected to transistors Q11 and Q12, forming the discriminator 42, through capacitors C1 and C2 and resistors R11 and R12, which form part of clamp circuit 46. Serially connected C1 and R11 are connected between terminal 40*a* and the base and emitter of Q12 and Q11 respectively, while the emitter and base of the same transistors are connected to R12 which is in turn connected to terminal 40*b* through C2. The junction point of R11 and the base of Q12 is also connected to the emitter of Q9, while the emitter of Q10 is connected to R12 and the emitter of Q12. The collectors of Q9 and Q10 are connected to ground while their bases are connected to the strobe generator at a terminal 65 through resistors R13 and R14 respectively and to a negative reference potential such as —4 volts through respective resistors R15 and R16. Capacitors C3 and C4 connect the bases of the two transistors to their respective collectors, as well as to ground.

In operation, in the absence of a pulse such as pulse 58 (FIGURE 3) from strobe generator 32, transistors Q9 and Q10 conduct, in essence grounding the emitters of Q9 and Q10. Consequently, the discriminator 42 is disabled. Also when the Y driver provides the drive current indicated in FIGURE 3 by pulse 51, due to the difference in voltage drop across diodes 25 and 26, a voltage difference or offset voltage is present at the input terminals 30*a* and 30*b* of sense amplifier 30. Capacitors C1 and C2 charge up to the offset voltage amplified by differential amplifier 40. However, when the strobe pulse is supplied, Q9 and Q10 are cut off, enabling the discriminator to sense the amplified signal produced by the differential amplifier in response to the signal supplied at input terminals 30*a* and 30*b* as a function of the core switchover.

As is appreciated, the clamp circuit 46 is useful to enable capacitors to charge up to positive voltages, due to the offset voltages at the input terminals 30*a* and 30*b*. However, in order to enable the capacitors to charge up to voltages of opposite polarities the clamp circuit may include another pair of transistors of opposite polarities to those of Q9 and Q10. That is two NPN transistors connected in an arrangement identical to that of Q9 and Q10 and provided with a negative strobe pulse may be included so that the capacitors C1 and C2 could be charged up to voltages of either polarity.

When an amplified signal, irrespective of polarity is sensed by the discriminator 42, the output amplifier 44 comprising transistor Q13, diode D5 and a base resistor R17 provides an output signal at output terminal 31. The time required for capacitors C1 and C2 to charge up to the amplified offset voltage is quite critical since the amplified signal, representing a switched core, cannot be detected until the capacitors are properly charged. However, in the sense amplifier of the present invention, by choosing resistors R11 and R12 to have low resistive values and due to the low output impedance of differential amplifier 40, the capacitors can be charged very fast, enabling the sense amplifier to be used in a memory system operated at a high speed.

Although herebefore the sense amplifier 30 has been described as compensating for the offset voltage produced by the difference in voltage drop across diodes 25 and 26 (FIGURE 1), it should be appreciated that the sense amplifier may be connected to a plurality of pairs of diodes, each pair connected to another drive-sense winding such as winding 14 and line 21 in order to supply the amplifier with a signal indicative of the switching of another core. The pairs of diodes need not be matched for identical voltage drop during conduction since any offset voltage produced thereby is used to charge capacitors C1 and C2 so that when a strobe pulse is supplied the sense amplifier is enabled to sense the small switching indicating signal despite the offset voltage. Thus, the novel sense amplifier described herein is particularly advantageous when a large number of drive sense windings are coupled to the same sense amplifier.

In FIGURE 4, the differential amplifier 40 is shown comprising of four amplification stages. An amplifier with identical characteristics, except for reduced gain, may be provided by eliminating transistors Q3 and Q4 and resistors R4 and R6 and connecting the collectors of Q1 and Q2 to the bases of Q5 and Q6. In such an arrangement the differential amplifier may be thought of as comprising of only three amplification stages in which all the transistors are of the same type, shown as PNP. This is most advantageous when constructing the amplifier as an integrated circuit since at the present state of the art of integrated circuitry it is difficult to construct elements of opposite polarities on the same semiconductive slice. The operation of the sense amplifier, including the differential amplifier with four or fewer amplification stages, may be improved by shunting a sensistor across resistor R1 to change the gain of the differential amplifier with temperature in order to compensate for the base/emitter voltage charge of the transistors Q11 and Q12 of discriminator 42.

There has accordingly been shown and described herein a novel sense amplifier capable of providing an output in response to small differential signals irrespective of large undesired differential signals such as produced by the driven current from the Y driver. The amplifier includes a novel multistage directly coupled transistorized differential amplifier the gain of which is a function of the ratio of a minimum number of components. It is appreciated that those familiar with the art may make modifications in the arrangements as shown without departing from the spirit of the invention.

What is claimed is:

1. In a coincident-current digital memory network having X driver means and Y driver means, drive-sense winding means coupled to magnetic memory elements and extending to one driver means, drive winding means coupled to magnetic memory elements and extending to the other driver means, a sense amplifier for providing an output signal as a function of a coincident signal induced in the drive-sense winding means which coincident signal indicates a switch in the magnetic remanence state of a magnetic memory element coupled to the drive-sense winding means and the drive winding means, the sense amplifier comprising:

a differential amplifier having first and second input terminal means extending to the drive-sense winding means, first and second output terminal means, a plurality of interconnected transistors and associated resistors forming a plurality of amplification stages intermediate the input terminal means and the output terminal means with the gain of the differential amplifier being a function of the ratio of the value of said resistors;

an output stage coupled to said first and second output terminal means for providing an output signal having a function dependent on the signal appearing at the output terminals of the differential amplifier; and a clamp circuit disposed between said output terminal means of the differential amplifier and the output stage for inhibiting the output stage from providing an output signal other than when the drive-sense winding means serves to sense the switching of a magnetic memory element coupled to the drive-sense winding.

2. The network of claim 1 further including diode means intermediate the input terminal means and the drive-sense winding means, whereby the drive current passing through said diode means produces a signal difference at said input terminal means; wherein the clamp circuit includes first and second capacitors respectively connected to said first and second output terminals means; and including means for controlling said capacitors to charge them up to a level representing the amplified signal difference produced by said drive current at said input terminal means.

3. The network of claim 2 wherein the clamp circuit includes means for receiving a strobe pulse to terminate the charging of said capacitors and enable the output stage to provide an output signal as a function of the signals at said input terminal means of the differential amplifier produced by the coincident signal on the drive-sense winding.

4. The network of claim 3 wherein the differential amplifier has a relatively low output impedance to minimize the time required for said capacitors of the clamp circuit to charge up to a level representing the amplified signal difference at the output terminal means of the differential amplifier.

5. The network of claim 4 wherein the output stage includes a symmetrical discriminator including a pair of transistors and an output amplifier, means coupling said pair of transistors of the discriminator through said first and second capacitors to said output terminal means of the differential amplifier to sense the amplified differential signal at said output terminal means irrespective of the polarity thereof when the clamp means responds to said strobe pulse, and means connecting said output amplifier to said pair of transistors of the discriminator to provide an output signal as a function of the amplified differential signal sensed thereby.

6. In combination with a digital memory system of the type including a memory element switchable between two states of magnetic remanence;

at least two drive windings inductively coupled to said element for switching said element as a function of X and Y drive currents in said windings, one of said windings further serving as a sense winding and adapted to carry a coincident signal indicative of the switching of said element from its one state of magnetic remanence to the other;

diode means coupled to said sense winding;

a sense amplifier including a multistage differential amplifier stage including first and second input terminal means extending to the diode means and first and second output terminal means the differential amplifier adapted to provide an amplified differential output signal at the output terminal means which is a function of the differential signal at said input terminal means; an output stage coupled to said output terminal means for providing an output signal which is a function of the amplified differential signal at said output terminal means; and a clamp circuit disposed between the output stage and said first and second output terminal means for controlling the output stage to provide said output signal sense winding and only as a function of a coincident signal rather than as a function of differential signals at said input terminal means resulting from voltage drop variations across the diode means produced by drive current flowing therethrough.

7. The combination defined in claim 6 wherein said differential amplifier comprises first and second halves each half including at least first, second and third transistors each transistors having a base, an emitter and a collector, means connecting the base of said first transistor to one of said input terminal means and the emitter thereof to one terminal of a first resistor, means connecting the collector and base of said first and second transistors respectively to one terminal of a second resistor, means connecting the emitter of said third transistor to the other terminal of said second resistor, means connecting the collector and base of said second and third transistors to a reference potential and means connecting the emitters of said first and second transistors and the collector of said third transistor to operating potentials whereby the gain of said differential amplifier is related to the sum of the resistance of the second resistors in the two amplifier halves divided by said first resistor.

8. The combination defined in claim 7 wherein all the transistors in said differential amplifier are of the same polarity.

9. The combination defined in claim 6 wherein said clamp circuit includes at least first and second capacitors disposed between the output stage and said first and second output terminal means and means for controlling the charging of said capacitors as a function of differential signals at said input terminal means resulting from voltage drop variations across the diode means produced by drive currents flowing therethrough, said clamp circuit including means responsive to a strobe pulse of a finite duration for inhibiting the charging of said capacitors during said finite duration.

10. The combination defined in claim 9 wherein said differential amplifier has a relatively low output impedance to minimize the time required for said capacitors to charge up to a level representing the amplified differential signals at the output terminals of said differential amplifier produced by differential voltage drops across the diode means.

References Cited

UNITED STATES PATENTS

| | | | |
|---|---|---|---|
| 3,034,107 | 5/1962 | Knowles | 340—174 |
| 3,166,681 | 1/1965 | Strong | 340—174 |
| 3,168,708 | 2/1965 | Stuart-Williams | 330—30 |
| 3,260,947 | 7/1966 | Dorsman | 330—30 |
| 3,315,089 | 4/1967 | Mayne | 330—30 |
| 3,309,538 | 3/1967 | Ashley et al. | 330—30 |
| 3,319,233 | 5/1967 | Amemiya et al. | 340—174 |
| 3,401,351 | 9/1968 | Ellestad | 330—30 |

BERNARD KONICK, Primary Examiner

B. L. HALEY, Assistant Examiner

U.S. Cl. X.R.

307—230; 330—30